United States Patent
Rouse

(10) Patent No.: US 9,710,616 B2
(45) Date of Patent: Jul. 18, 2017

(54) DRM PLUGINS

(75) Inventor: Alan Rouse, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 1291 days.

(21) Appl. No.: 12/968,844

(22) Filed: Dec. 15, 2010

(65) Prior Publication Data

US 2012/0159182 A1    Jun. 21, 2012

(51) Int. Cl.
G06F 11/30 (2006.01)
G06F 12/14 (2006.01)
G06F 21/10 (2013.01)

(52) U.S. Cl.
CPC ............................. G06F 21/10 (2013.01)

(58) Field of Classification Search
CPC .... G06F 21/602; G06F 21/72; G06F 12/1408; H04L 2209/24; G09C 1/00
USPC ............................................... 713/189
See application file for complete search history.

(56) References Cited

U.S. PATENT DOCUMENTS

| 7,065,653 B1 * | 6/2006 | Yoneda ................ 713/193 |
| 2006/0159117 A1 | 7/2006 | Furlong et al. |
| 2007/0005506 A1 | 1/2007 | Candelore |
| 2007/0127719 A1 | 6/2007 | Selander et al. |
| 2007/0180246 A1 * | 8/2007 | Evans et al. ............ 713/169 |
| 2008/0282083 A1 * | 11/2008 | Risan et al. ............ 713/153 |
| 2009/0013174 A1 * | 1/2009 | Foti et al. ............... 713/151 |
| 2010/0104002 A1 | 4/2010 | Kreiner et al. |

FOREIGN PATENT DOCUMENTS

| CN | 101286809 A | 10/2008 |
| WO | WO 2009/135409 | 11/2009 |

OTHER PUBLICATIONS

ETSI TS 102 006 v1.3.1 (May 2004) Digital Video Broadcasting (DVB); Specification for System Software Update in DVB Systems.

* cited by examiner

Primary Examiner — Teshome Hailu
Assistant Examiner — Stephen Sanders

(57) ABSTRACT

Presented is a system and methods for receiving metadata, a decryption module and encrypted content from a cable headend, decrypting the encrypted content with the decryption module and presenting the decrypted content to a user. The client device can receive, load and execute any decryption module compatible with the system framework allowing flexibility in the choice or changing of client device manufacturer and/or Digital Rights Management system vendor.

17 Claims, 7 Drawing Sheets

DRM PLUGINS

TECHNICAL FIELD

The present invention relates generally to Digital Rights Management (DRM) systems and more specifically to a framework for implementing a multi-vendor DRM system on a client device.

BACKGROUND

The digital age has provided great convenience to society with regard to the online availability of entertainment content. What once began as a trip to the theatre to see a movie became a trip to the video store to pick up a digital video disc (DVD) and now is a selection on the television screen to stream a content provider's movie from a service provider to the subscriber's client device for playback.

A realized requirement of the evolution of digital content and the ability to transmit the digital content from a service provider to a subscriber's client device is the need for encrypting the digital content before transmission to protect the property rights of the content provider. Historically, a content provider delivered unprotected digital content to a service provider. The service provider, using a DRM system based on the cable headend/client device combination selected by the service provider, encrypted the digital content. The encrypted content was then delivered to authorized service provider subscribers, along with a key required for decryption. The client device, manufactured with a specific DRM system vendor's decryption module, combined the key with the decryption module, decrypted the content and presented the content to the user.

As the DRM system market evolved, an increasing number of DRM system vendors appeared, providing incompatible proprietary DRM systems. Over time, a service provider distributed client devices from different manufacturers, with different DRM system decryption modules. Consequently, when a subscriber selected digital content, the service provider had to determine which client device was in use and deliver the encrypted digital content compatible with the decryption module in use by the client device.

The net result of the distribution of client devices with different DRM system implementations is the requirement for a service provider to maintain multiple copies of the same content, with each copy implementing a different DRM system. The redundancy of encrypted digital content is required because the state of the art for client devices is hard coded support for a single DRM system and its associated decryption module.

In another shortcoming of the state of the art in service provider based content delivery systems, the content provider is unable to select a DRM system vendor of their choice and deliver the service provider encrypted content and a decryption system useable by the service provider's installed client devices. Demand is increasing for content providers to select their own DRM system and deliver encrypted content. Further, service providers would like the flexibility to select new content delivery systems based on advances in technology and a competitive marketplace instead of a selection based predominantly on the cost of replacing the installed base of client devices.

Market pressure for a solution allowing a client device to decrypt a content provider's content regardless of the DRM system vendor selected by the content provider has led to several attempts to solve the problem. For instance, a DRM system vendor can provide different decryption algorithms associated with their proprietary DRM system but not allow decryption of content encrypted by other DRM system vendors. Although these attempts are useful, they still require the service provider to maintain one copy of the encrypted content for each supported DRM system vendor. They do not, however, allow a client device to decrypt a content provider's content regardless of the DRM system implemented by the content provider or the service provider.

Accordingly, it would be desirable to provide a solution that allows a service provider to maintain a single copy of a content provider's content, encrypted by a DRM system of the content/service provider's choosing, and a client device capable of decrypting content encrypted by any available DRM system. The solution should also provide, among other things, the ability for a content/service provider to change DRM systems without requiring the distribution of new client devices by the service provider. Further, the solution should allow a service provider to select a new hardware vendor for their cable headend/client devices without requiring the content/service provider to change DRM system vendors.

SUMMARY

Systems and methods according to the present invention address the market needs described above by providing a framework on the client device for receiving a decryption module capable of decrypting the selected digital content based on the specific DRM system used to encrypt the digital content. In one exemplary embodiment, the decryption module is embedded in the digital content streamed from the service provider to the client device. Further, metadata, also provided in the stream from the cable headend to the client device, and known to the framework, instructs the client device in extracting the decryption module from the streaming data. The exemplary client device then uses the extracted decryption module and the previously provided key to decrypt the remainder of the stream and display the content to the service provider subscriber.

In one aspect of an exemplary embodiment, the digital content streamed from the service provider's cable headend to the client device can contain metadata indicating the encryption type. Based on this information, the client device can request the appropriate decryption module from the cable headend. After receiving the decryption module and the key, the exemplary client device can decrypt the streamed digital content and display the digital content to the service provider subscriber. In another aspect of an exemplary embodiment, the client device can determine if the decryption module currently installed in the framework is compatible with the newly selected digital content. If the currently streaming digital content and the installed decryption module are compatible then there is no need to request a new decryption module and the client device can begin decrypting and displaying the digital content.

According to another exemplary embodiment, a content provider can select one or more DRM vendors and provide encrypted content to a service provider. The content provider has the flexibility to select or change DRM system vendors based on non-limiting factors such as the type of digital content to be encrypted or the availability of lower cost DRM systems. The content provider creates decryption modules, compatible with the framework installed on the client device, for each implemented DRM system. The content provider encrypts the digital content and combines the encrypted content with the decryption module and the metadata for locating the encryption module in the digital content file provided to the service provider. When the digital content is selected by a subscriber, the service provider streams the content, including the metadata and the decryption module to the client device and the client device framework extracts the decryption module, based on the metadata information, decrypts the digital content and display the digital content to the subscriber. In this context, the unencrypted content exists only transiently on the client device as it is displayed to the subscriber.

According to another exemplary embodiment, the decryption modules exist separately from the encrypted digital content and a reference to the required decryption module is embedded in the digital content along with metadata identifying the location of the decryption module reference. The digital content is streamed to the client device and the framework, based on the metadata, extracts the reference from the digital content and requests the appropriate decryption module from the cable headend. The cable headend sends the requested decryption module, and the decryption key, to the client device and the client device decrypts the encrypted digital content and displays the digital content to the subscriber.

In another exemplary embodiment, a method for decrypting encrypted content, from a content provider, on a client device associated with a service provider is presented. The exemplary method includes the following steps. First in the exemplary method, the client device receives metadata, identifying a location of a decryption module, from a service provider. Next in the exemplary method, the client device receives the decryption module from the specified location. Continuing in the exemplary method, the client device decrypts the encrypted content using the decryption module and a decryption key previously obtained from the service provider. Next in the exemplary method, the client device processes the decrypted content.

According to another exemplary embodiment, a system for decrypting, by a client device, an encrypted portion of a digital content stream transmitted from a service provider toward the client device is presented. The exemplary system includes a metadata component for determining the location of a decryption module based on the received metadata. The exemplary system also includes a decryption component for obtaining a decryption module from the location specified by the metadata. Further, the exemplary system includes a client engine framework for facilitating the interaction between the metadata component and the decryption component.

In another exemplary embodiment, a method for delivering a decryption module, based on encrypted content from a content provider, from a service provider to a client device is presented. First in the exemplary method, the service provider transmits metadata associated with identifying a location of a decryption module toward the client device. Next in the exemplary method, the service provider transmits the decryption module towards the client device. Next in the exemplary module, the service provider transmits the encrypted content toward the client device.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
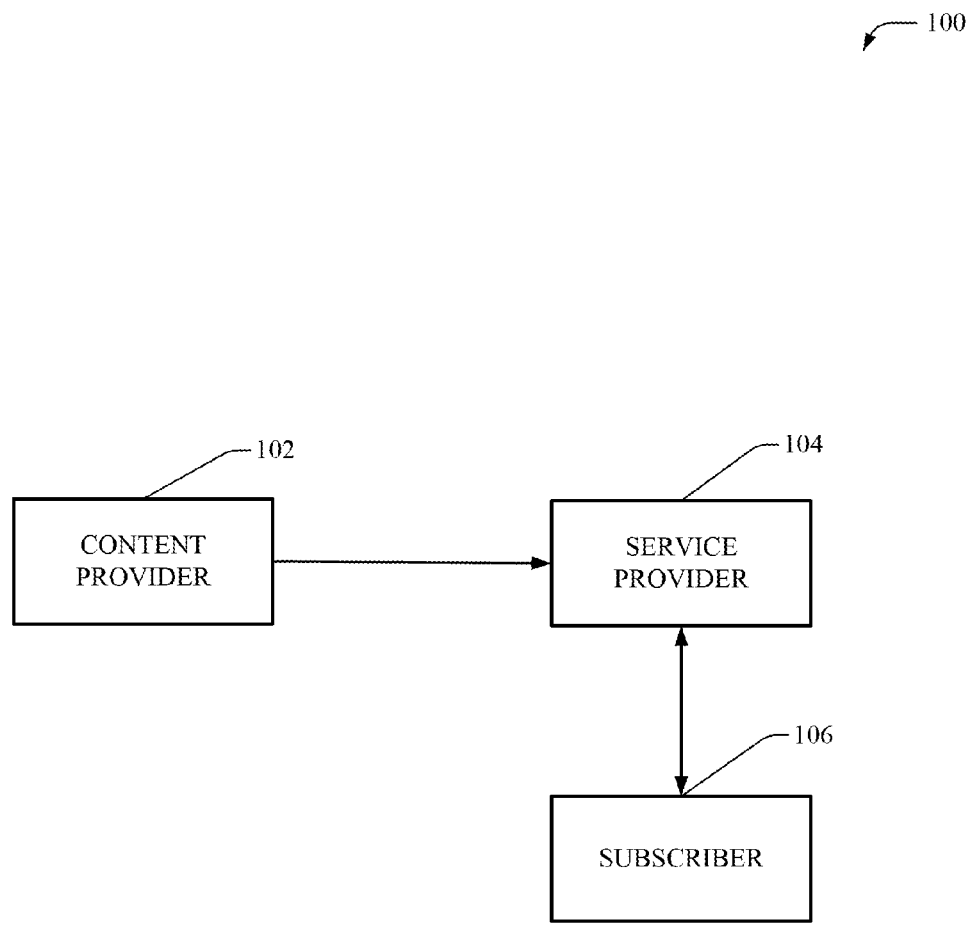
FIG. 1 depicts an exemplary system for delivering metadata, encryption modules and encrypted content to a subscriber.

Looking first to FIG. 1, a diagram of an exemplary digital rights management (DRM) plugins system 100 for delivering metadata, decryption modules and encrypted digital content from a content provider through a service provider to a subscriber is illustrated. The exemplary DRM plugins system 100 includes but is not limited to an exemplary content provider 102, an exemplary service provider 104 and an exemplary subscriber 106. The content provider 102 provides the digital content to the service provider 104 for distribution to authorized subscribers 106.

In one exemplary embodiment, the content provider 102 can encrypt the digital content with an encryption module associated with a DRM system selected by the content provider 102. Continuing with the exemplary embodiment, the content provider 102 can deliver the encrypted digital content and a compatible decryption module to the service provider 104. In another aspect of the exemplary embodiment, the subscriber 106 selects an encrypted digital content and the service provider 104 prepares the digital content for delivery. In a further aspect of the exemplary embodiment, the service provider 104 can generate metadata associated with the compatible decryption module and transmit the metadata toward the subscriber 106. Continuing with the exemplary embodiment, the service provider 104 can transmit the decryption module toward the subscriber 106 and then can transmit the encrypted content toward the subscriber 106. In another aspect of the exemplary embodiment, the subscriber 106 can process the metadata and can determine a location in the digital stream of the decryption module and can extract the decryption module from the digital stream. Continuing with the exemplary embodiment, the subscriber can execute the decryption module, decrypt the encrypted digital content and provide the decrypted digital content to a user.

In another exemplary embodiment, the metadata, generated by the service provider 104 and transmitted toward the subscriber 106, can provide the subscriber 106 a reference to the location of the decryption module, with the decryption module located, for example, on a server associated with the service provider 104 or, in another example, on a server associated with the content provider 106. Continuing with the exemplary embodiment, the subscriber 106 can obtain the decryption module from the location specified by the reference, execute the decryption module, decrypt the encrypted digital content and provide the decrypted digital content to a user.

In another exemplary embodiment, the content provider 102 can deliver unencrypted digital content to the service provider 104 and allow the service provider 104 to encrypt the unencrypted digital content with an encryption module associated with a DRM system selected by the service provider. In a further aspect of the exemplary embodiment, the service provider 104 can generate the metadata associated with the encrypted digital content and transmit the metadata and the decryption module toward the subscriber 106. Continuing with the exemplary embodiment, the service provider can forward the encrypted digital content toward the subscriber. In another aspect of the exemplary embodiment, the subscriber 106 can obtain the decryption module based on a location specified in the metadata and can execute the decryption module to decrypt the encrypted digital content. Further, the exemplary embodiment subscriber 106 can display the decrypted digital content to a user.

Figure 2:
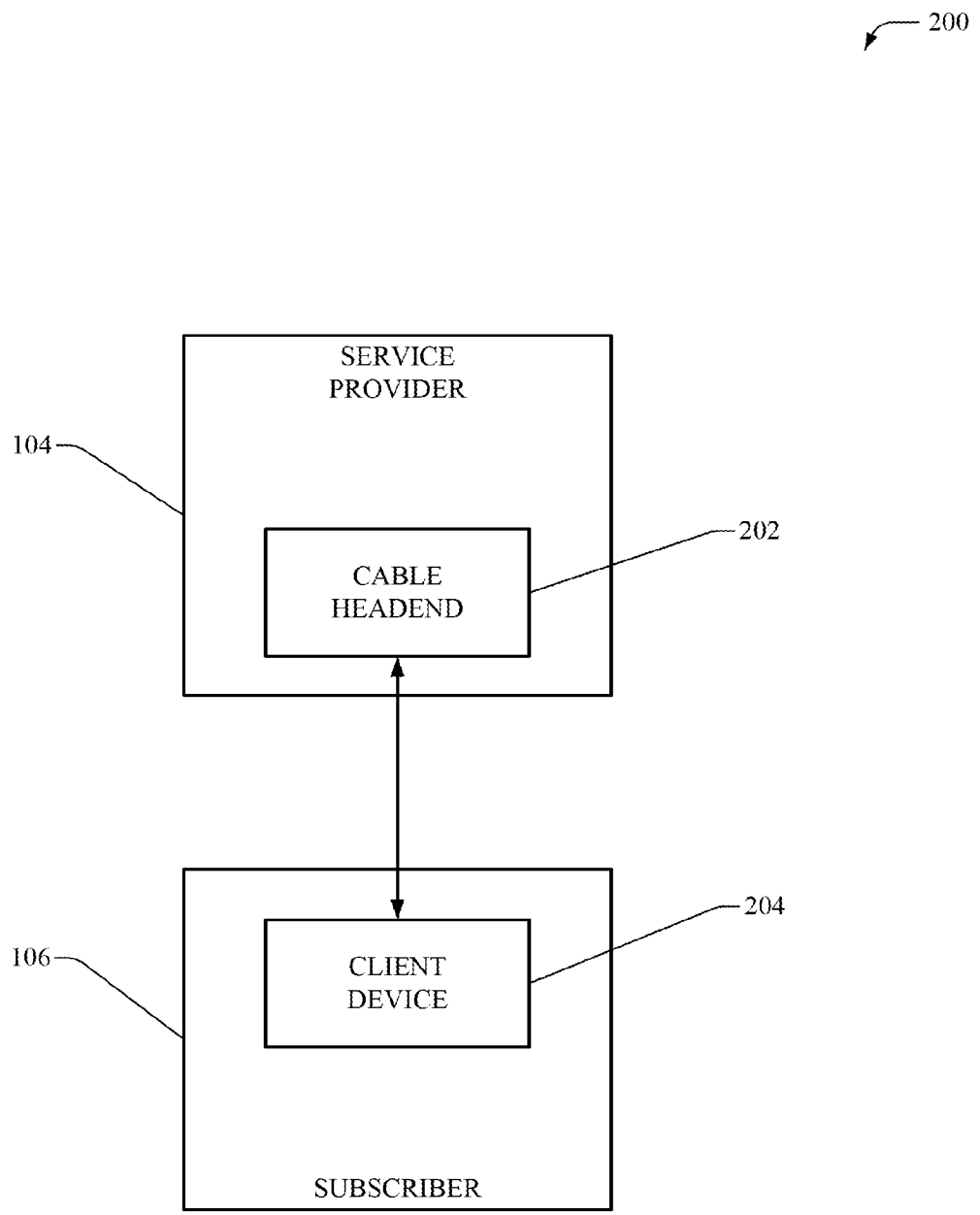
FIG. 2 depicts an exemplary system for delivering metadata, encryption modules and encrypted content from a service provider cable headend to a subscriber client device.

Continuing with FIG. 2, another exemplary embodiment of a DRM plugins system 200 is illustrated. In this exemplary embodiment, the service provider 104 can include a cable headend 202 as the hardware and software system implementing the server side support of the exemplary DRM plugins system 200 and the subscriber 106 can include a client device 204 as the hardware and software system implementing the exemplary DRM plugins system 200 framework. In another aspect of the exemplary embodiment, the service provider 104 can have a plurality of cable headends 202 and the cable headends 202 can be from different manufacturers. In a further aspect of the exemplary embodiment, each cable headend 202 can support a plurality of client devices 204 and the client devices 204 can be from different manufacturers. Continuing with another aspect of the exemplary embodiment, the client device can be a set top box for providing audio and video digital content to a user for viewing on a television or a personal computer.

Figure 3:
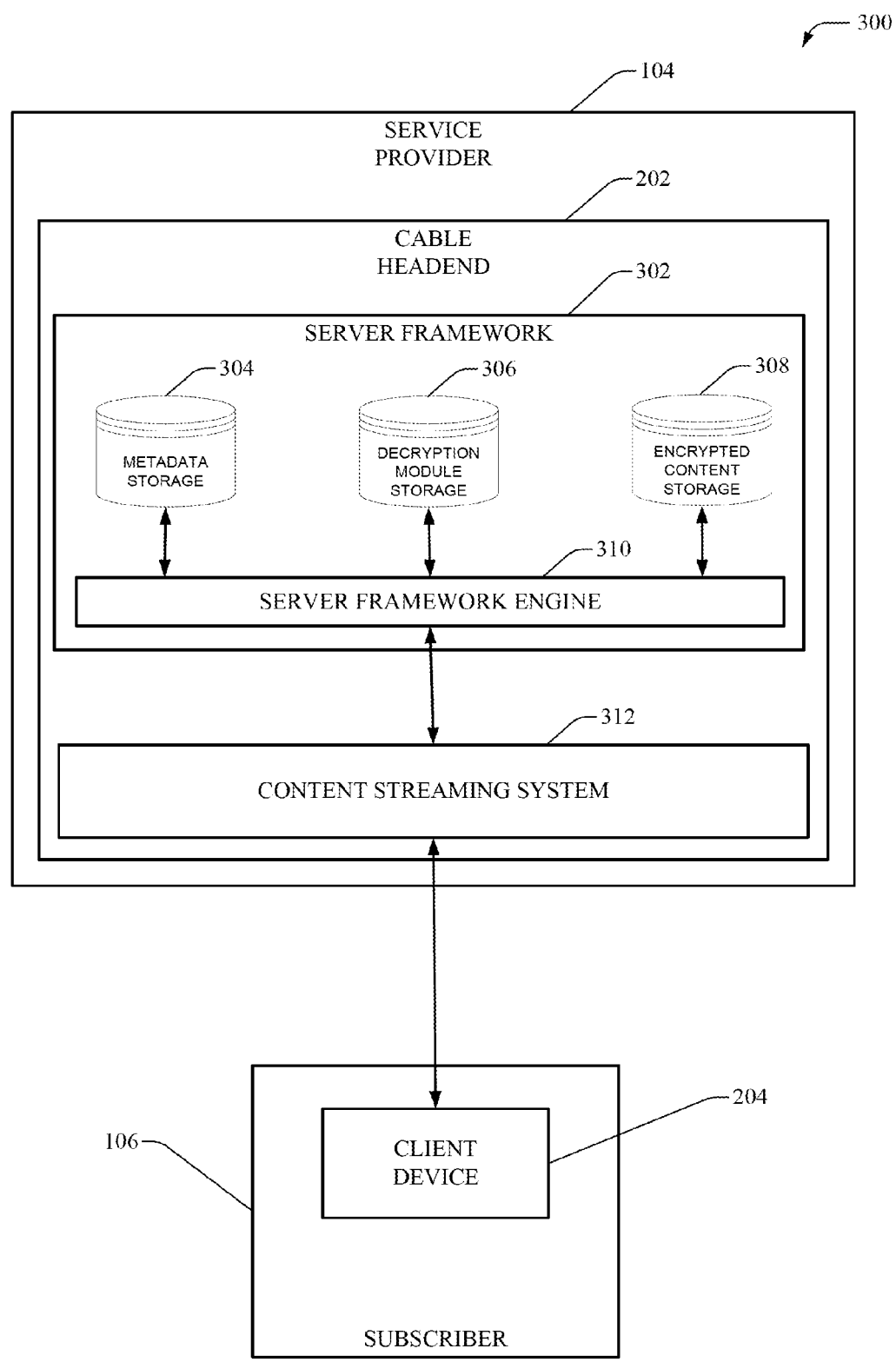
FIG. 3 depicts an exemplary system for delivering metadata, encryption modules and encrypted content from a service provider server framework component of a cable headend to a subscriber client device.

Turning now to FIG. 3, another exemplary embodiment of a DRM plugins system 300 can include a cable headend 202 and its associated server framework 302 and content streaming system 312. Continuing with the exemplary embodiment, the server framework 302 can include metadata storage 304, decryption module storage 306, encrypted content storage 308 and a server framework engine 310. In one aspect of the exemplary embodiment, the metadata storage 304 can provide storage for the metadata associated with a plurality of decryption modules. In another aspect of the exemplary embodiment, the server framework engine 310 can obtain metadata from the metadata storage 304 based on the encrypted digital content selected by a user.

Continuing with the exemplary embodiment, decryption module storage 306 can provide storage for a plurality of decryption modules associated with encrypted digital content. In another aspect of the exemplary embodiment, the encryption modules can be supplied by, but not limited to, the content provider 102, the service provider 104 or as part of a DRM system obtained from a DRM system vendor. Further, in another aspect of the exemplary embodiment, encrypted content storage 308 can provide storage for a plurality of encrypted content. In one aspect of the exemplary embodiment, an encrypted digital content from the encrypted content storage 308 can be matched to a decryption module from the decryption module storage 306 and metadata from the metadata storage 304 based on a user selection of an encrypted digital content.

In another aspect of the exemplary embodiment, a server framework engine 310 can receive a request from a client device 204, delivered through a content streaming system 312, for a particular encrypted digital content stored on encrypted content storage 308. Continuing with the exemplary embodiment, the server framework engine 310 can obtain the metadata from the metadata storage 304 and the decryption module from the decryption module storage 306 associated with the selected encrypted digital content. In another aspect of the exemplary embodiment, the server framework engine 310 can transmit the metadata, decryption module and encrypted content through the content streaming engine 312 to the requesting client device 204.

Figure 4:
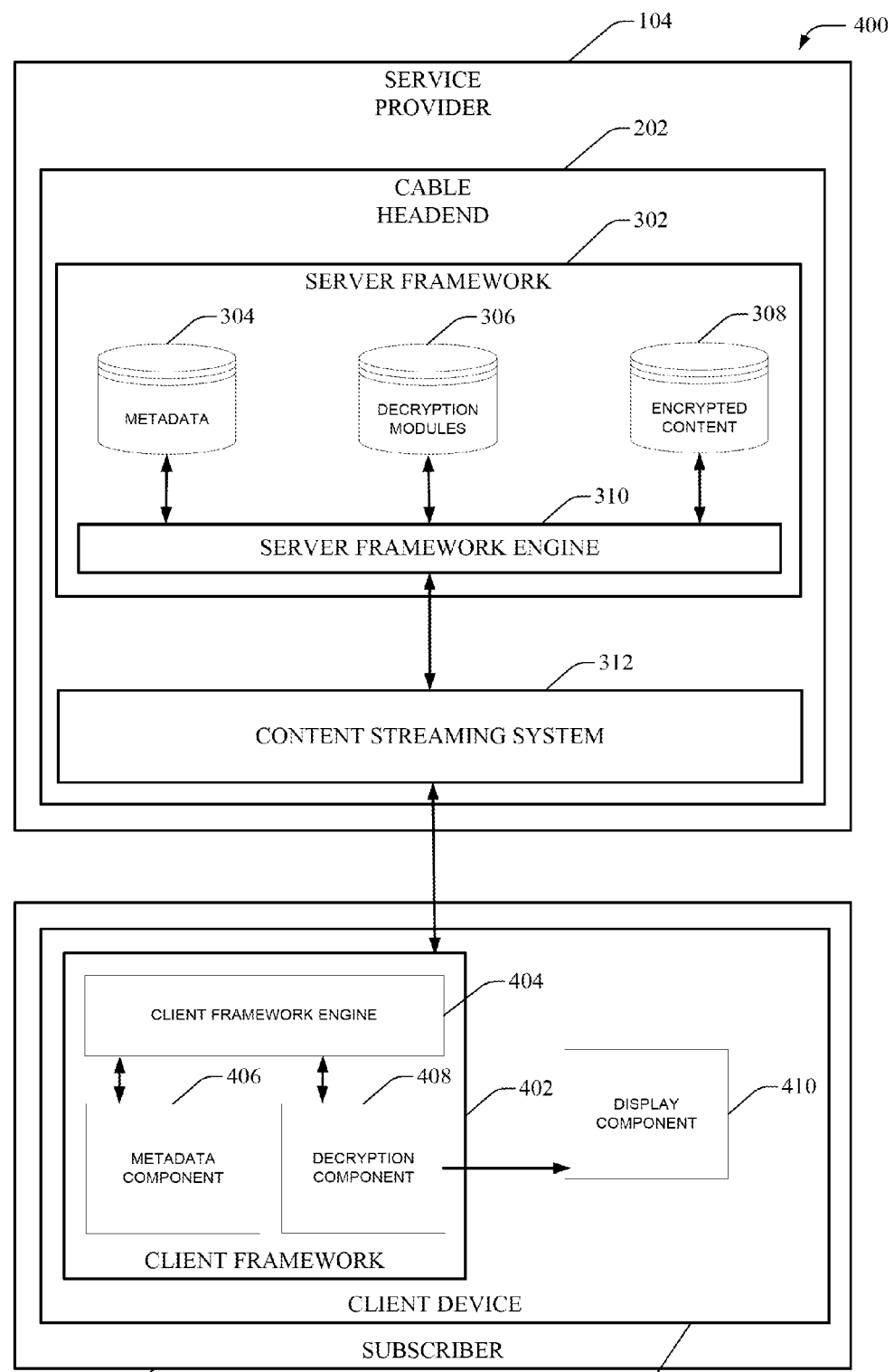
FIG. 4 depicts an exemplary system for delivering metadata, encryption modules and encrypted content from a service provider server framework component of a cable headend to a subscriber client device client framework.

Looking now to FIG. 4, another exemplary embodiment of a DRM plugins system 400 can include a client device 204 and its associated client framework 402 and display component 410. Continuing with the exemplary embodiment, the client framework 402 can include a client framework engine 404, a metadata component 406 and a decryption component 408. In another aspect of the exemplary embodiment, the client framework engine component 404 can coordinate the operation of the metadata component 406 and the decryption component 408. In another aspect of the exemplary embodiment, the client framework engine can process communications between the content streaming system 312 of the cable headend 202 and the client device 204. Continuing with the exemplary embodiment, the client framework engine component 404 can engage the metadata component 406 and/or the decryption component 408 to further process the digital data stream.

In another aspect of the exemplary embodiment, the metadata component 406, when directed by the client framework engine component 404, can analyze the digital data stream and determine the location of the decryption module associated with the encrypted portion of the digital data stream. Continuing with the exemplary embodiment, the metadata component 406 can analyze the digital data stream and determine the type of decryption module associated with the encrypted portion of the digital data stream. In the exemplary embodiment, the metadata component 406 can determine if the decryption module type specified in the digital data stream matches the decryption module type currently installed in client device 204 then the encrypted portion of the digital data stream can be decrypted without making any further configuration changes to the client device 204.

Continuing with the exemplary embodiment, the decryption component 408 can obtain, load and execute the decryption module, located by the metadata component 406, and decrypt the encrypted portion of the digital data stream. In another aspect of the exemplary embodiment, the decryption component 408 can maintain storage for the currently installed decryption module allowing reuse of the decryption module until the arrival of encrypted digital content associated with a different encryption module. Continuing with the exemplary embodiment, the decryption component 408 can direct the decrypted digital data stream to the display component 410 for display on the user's display device.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations as captured via events and/or data. Captured data and events can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
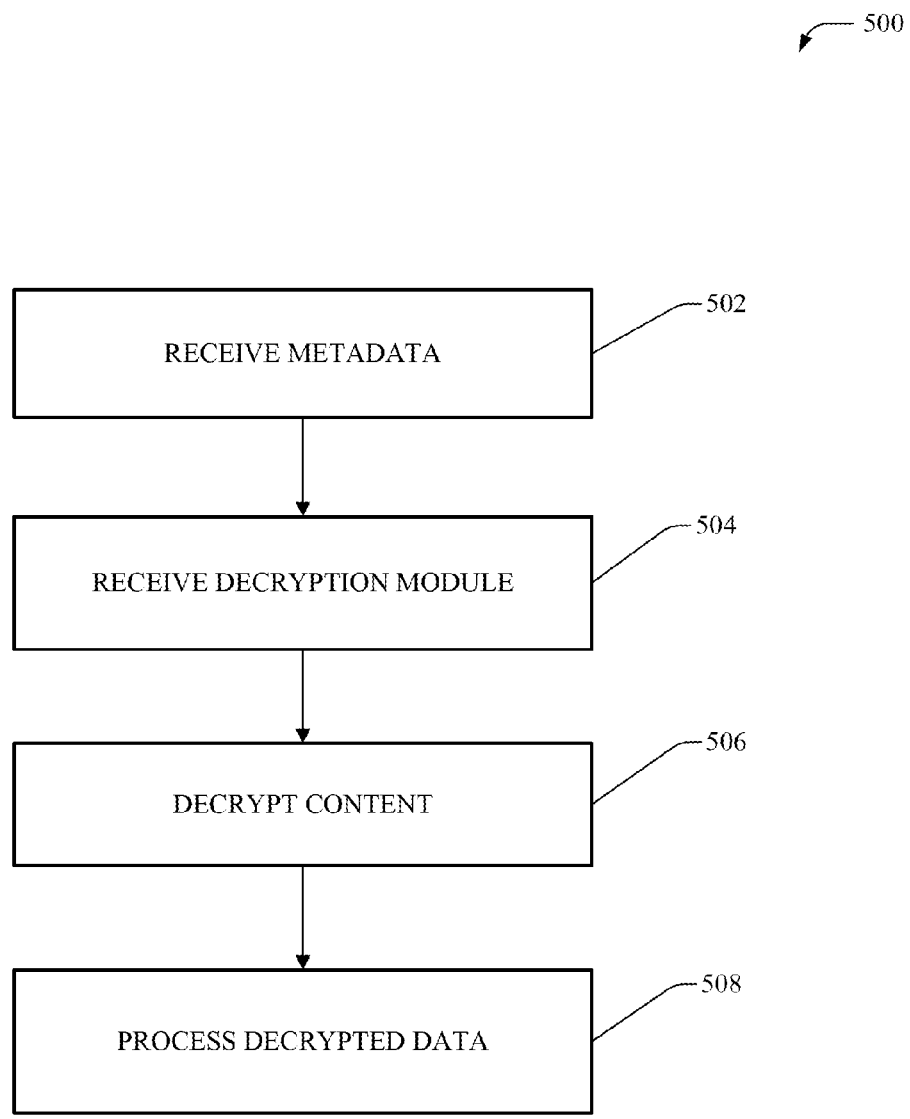
FIG. 5 depicts a method of decrypting encrypted content based on receiving metadata and a decryption module, compatible with the encrypted content, from a service provider.

Looking now to FIG. 5, an exemplary method embodiment 500 based on downloading metadata and decryption modules to a client device 204 for decrypting encrypted digital content by the client device 204 is depicted. Starting at exemplary method embodiment step 502, the client device 204 can receive metadata in a digital data stream from a cable headend 202. In this exemplary method embodiment, the metadata can provide the location of the decryption module in the digital data stream. For a non-limiting example, the location can be specified as an offset from the beginning of the digital data stream to the beginning of the decryption module, in the digital data stream, and the length of the decryption module. Next, at exemplary method embodiment step 504, the client device 204 can receive the decryption module in the digital data stream. For another non-limiting example, the client device 204 can receive the decryption module by extracting the decryption module from the digital data stream and storing the decryption module for use in decrypting the encrypted portion of the digital data stream. In the exemplary method embodiment, the client device 204 can locate the encryption module in the digital data stream based on the previously received metadata.

Continuing to exemplary method embodiment step 506, the downloaded decryption module can be installed in the client framework 402 and executed to decrypt the encrypted portion of the digital data stream. In another non-limiting example, the decryption module can be a Java module and can be executed in a Java virtual machine. Next, at exemplary method embodiment step 508, the client device 204 can process the decrypted digital data stream and provide the decrypted and processed digital data stream to the display component 410 for display to the user. In a further non-limiting example, the client device 204 can be a set top box and the set top box and the decrypted output can be a pay-per-view movie streamed to a user's television for display.

Figure 6:
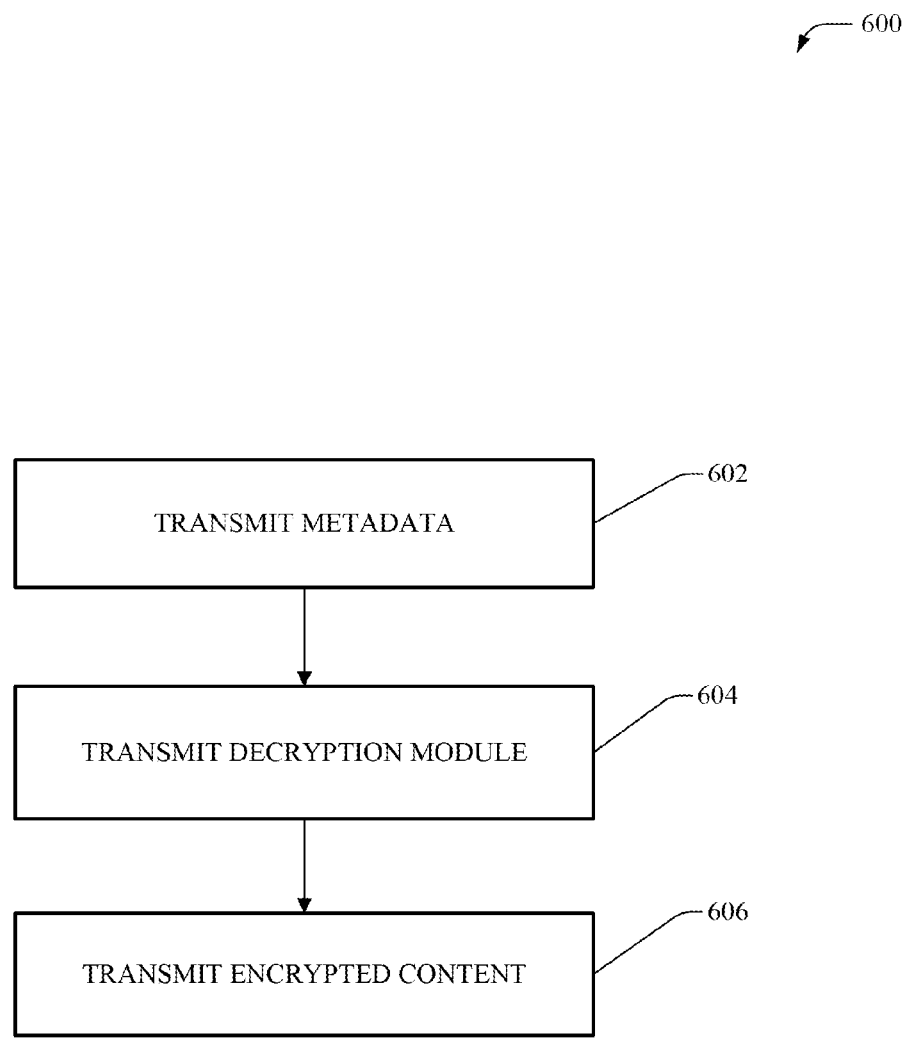
FIG. 6 depicts a method of providing metadata, decryption modules and encrypted content from a service provider to a client device.

Looking now to FIG. 6, an exemplary method embodiment 600 for transmitting metadata, decryptions modules, and encrypted digital data is depicted. Beginning at exemplary method embodiment step 602, the cable headend 202 can transmit metadata toward a client device 204. An exemplary metadata transmission can include, but is not limited to, the location of the decryption module in the digital data stream. Next, at exemplary method embodiment step 604, the cable headend can transmit a decryption module toward the client device 204. In a non-limiting exemplary method embodiment, the decryption module can be placed in the digital data stream at a location specified in the previously transmitted metadata. In another non-limiting exemplary method embodiment, a reference to the identity of the decryption module and the storage location of the decryption module on the cable headend 202, can be placed in the digital data stream, at a location specified in the previously transmitted metadata and transmitted toward the client device 204. Next, at exemplary method embodiment step 606, the cable headend 202 can transmit the encrypted content to the client device 204. In another non-limiting exemplary embodiment, the encrypted content can be a pay-per-view sporting event transmitted to a user's personal computer for display.

Figure 7:
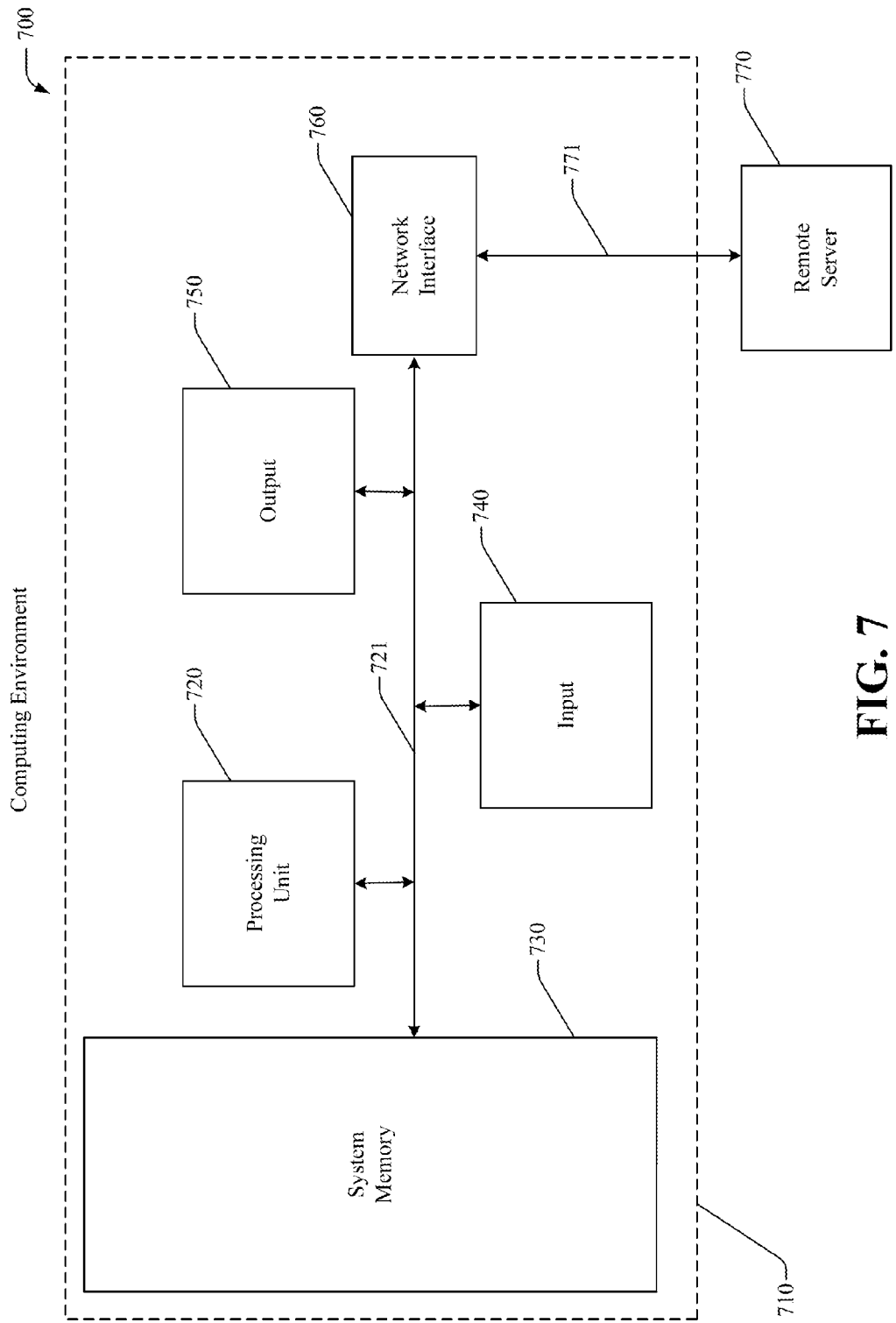
FIG. 7 depicts an exemplary computing device for implementing a system for adjusting virtual key positions and sizes on a virtual keyboard based on a user signature according to an exemplary embodiment.

FIG. 7 illustrates an example of a suitable computing system environment 700 in which the claimed subject matter can be implemented, although as made clear above, the computing system environment 700 is only one example of a suitable computing environment for a mobile device and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

Looking now to FIG. 7, an example of a device for implementing the previously described innovation includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

The computer 710 can also include other removable/non-removable and volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 720 through user input 740 and associated interface(s) that are coupled to the system bus 721, but can be connected by other interface and bus structures, such as a parallel port, game port or a universal serial bus (USB).

A graphics subsystem can also be connected to the system bus 721. In addition, a monitor or other type of display device can be connected to the system bus 721 through an interface, such as output interface 750, which can in turn communicate with video memory. In addition to a monitor, computers can also include other peripheral output devices, such as speakers and/or printing devices, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such as a local area network (LAN) or a wide area network (WAN), but can also include other networks/buses.

When used in a LAN networking environment, the computer 710 is connected to the LAN 771 through a network interface or adapter 760. When used in a WAN networking environment, the computer 710 can include a communications component, such as a modem, or other means for establishing communications over a WAN, such as the Internet. A communications component, such as a modem, which can be internal or external, can be connected to the system bus 721 through the user input interface at input 740 and/or other appropriate mechanism.

In a networked environment, program modules depicted relative to the computer 710, or portions thereof, can be stored in a remote memory storage device. It should be noted that the network connections shown and described are exemplary and other means of establishing a communications link between the computers can be used.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method, stored in a memory and executing on a processor of a client device, for decrypting a selected digital content which is encrypted using one of a plurality of different encryption techniques, said method comprising:
   receiving a digital content stream from a service provider, wherein the digital content stream further comprises
      said selected digital content,
      a decryption module associated with said one of said plurality of different encryption techniques, said decryption module capable of decrypting the selected digital content, and
      metadata that instructs said client device in extracting the decryption module from said digital content stream;
   extracting said decryption module as instructed by said metadata from said digital content stream; and
   decrypting, by said client device, said selected digital content with said decryption module and a decryption key.

2. The method of claim 1, wherein said metadata comprises a beginning location and an ending location of said decryption module in the digital content stream from the service provider and received by said client device.

3. The method of claim 1, wherein said metadata comprises a type identifier associated with said decryption module.

4. The method of claim 1, further comprising storing, at said client device, said decryption module for use with a subsequently received encrypted content.

5. The method of claim 4, further comprising replacing said stored decryption module with a subsequently received decryption module.

6. The method of claim 3, further comprising requesting, by said client device, said decryption module from said service provider based on said type identifier.

7. The method of claim 1, wherein said client device is a set-top box and said decrypted content is provided to a display system.

8. A system for decrypting a selected digital content which has been encrypted using one of a plurality of different encryption techniques, said system comprising:
- a processor for executing computer instructions and a non-transitory computer-readable memory for storing computer-readable instructions wherein said computer-readable instructions, when executed by said processor, are configured to:
  - receive a digital content stream from a service provider, wherein the digital content stream further comprises:
    - said selected digital content,
      - a decryption module associated with said one of said plurality of different encryption techniques, said decryption module capable of decrypting said selected digital content, and
      - metadata that instructs said client device in extracting said decryption module from said digital content stream;
  - extract said decryption module as instructed by said metadata from said digital content stream; and
  - decrypt said selected digital content with said decryption module and a decryption key.

9. The system of claim 8, wherein said decryption module is extracted from an unencrypted portion of said digital content stream.

10. The system of claim 8, wherein said computer readable instructions further comprise store, in a storage location, said decryption module based on metadata associated with said decryption module.

11. The system of claim 8, wherein said metadata is stored in an unencrypted portion of said digital content stream.

12. A method, stored in a memory and executing on a processor, for delivering a decryption module associated with one of a plurality of different encryption techniques from a service provider to a client device, said method comprising:
- transmitting, from said service provider, a digital content stream, wherein said digital content stream further comprises
  - selected digital content,
  - a decryption module associated with one of said plurality of different encryption techniques, said decryption module capable of decrypting said selected digital content, and
  - metadata that instructs said client device in extracting said decryption module from said digital content stream.

13. The method of claim 12, further comprising storing, at said service provider, said metadata in a first storage location associated with said service provider.

14. The method of claim 12, wherein said selected digital content was encrypted, at said content provider, by said content provider.

15. The method of claim 12, wherein said decryption module was created, at said content provider, by said content provider.

16. The method of claim 12, further comprising receiving, at said service provider, said decryption module from said content provider.

17. The method of claim 12, further comprising receiving, at said service provider, said metadata from said content provider.

* * * * *